United States Patent [19]

Stecher

[11] 4,321,463
[45] Mar. 23, 1982

[54] LOW FREQUENCY LASER FIBEROPTIC DETECTOR APPARATUS FOR MUSICAL INSTRUMENTS AND INTRUSION DETECTION

[76] Inventor: Samuel J. Stecher, 390 Ogden Ave., Jersey City, N.J. 07307

[21] Appl. No.: 104,560

[22] Filed: Dec. 17, 1979

[51] Int. Cl.³ .............................................. G02B 5/14
[52] U.S. Cl. .................................. 250/227; 84/1.18; 340/566
[58] Field of Search .................. 84/1.14, 1.15, 1.16, 84/1.18; 250/227; 340/566; 350/96.29; 455/605, 612, 613, 614

[56] References Cited

U.S. PATENT DOCUMENTS

| | | | |
|---|---|---|---|
| 3,625,589 | 12/1971 | Snitzer | 350/96.29 |
| 3,920,982 | 11/1975 | Harris | 250/199 |
| 4,011,754 | 3/1977 | Pitt | 250/227 |
| 4,028,977 | 6/1977 | Ryeczek | 84/1.18 |
| 4,071,753 | 1/1978 | Fulenwider et al. | 250/227 |
| 4,086,484 | 4/1978 | Steensma | 350/96.29 |
| 4,128,759 | 12/1978 | Hunt et al. | 350/96.13 |
| 4,162,397 | 7/1979 | Bucaro et al. | 350/96.29 |
| 4,235,113 | 11/1980 | Carome | 350/96.29 |

*Primary Examiner*—David C. Nelms
*Attorney, Agent, or Firm*—Richard C. Woodbridge

[57] ABSTRACT

An optical fiber is used as a transducer to convert a low frequency mechanical disturbance into low frequency amplitude modulated optical energy. According to the preferred embodiment of the invention transduction occurs by means of a multi-path interference phenomena capable of responding to acoustic information ranging from less than one hundredth of a cycle per second to several hundred thousand cycles per second. This feature of the invention makes the general concept applicable to use in musical instruments or as a security sensing device. When the concept is applied to a musical instrument it would preferably include the following elements in series: a solid state laser, a multi-mode or single index optic fiber, a square law detector, such as a photodiode, an audio amplifier and a speaker. When the concept is applied in the embodiment of a security sensing apparatus it would preferably include the same active elements (i.e. a solid state laser, a multi-mode or single index optic fiber, an optical detector), but the amplifier section would further include special circuitry and discrimination logic. In the security sensor embodiment the output of the device can be made compatible with any number of existing discrimination techniques based upon power spectrum densities and frequencies of domain. The length of the security sensor cable would be typically longer than the device when employed in a musical instrument and would be in the neighborhood of 100 meters.

9 Claims, 12 Drawing Figures

LOW FREQUENCY LASER FIBEROPTIC DETECTOR APPARATUS FOR MUSICAL INSTRUMENTS AND INTRUSION DETECTION

U.S. GOVERNMENT RIGHTS

Part of the research that formed the background of this invention was performed while the inventor was an employee of the U.S. Air Force and the U.S. Government reserves a non-exclusive, irrevocable, royalty-free license to practice this invention with power to grant licenses for all governmental purposes.

BACKGROUND OF THE INVENTION

1. Field of the Invention

The invention relates to low frequency seismic/acoustic transducers in general and to musical instruments and line sensors in particular.

2. Description of the Prior Art

There are a variety of methods known in the prior art for producing a modulated electrical signal proportional to a disturbance. Such techniques include metal "electronic" strings, inductive pick-ups or devices which sense the change in the electronic parameters of a system such as a variation in capacitance. Such devices have problems both in the musical field as well as in the security field. When steel strings are used on musical instruments they usually sound tinny or metallic in pitch. This may produce an "electric sound" wherein the instrument from which the sound issues is secondary in effect to the metallic sound of the strings. Metal strings or sensors as used in the security field loose their effectiveness of their locations are known. Unfortunately, metal sensors may be detected with simple metal detectors as currently available. By employing fiberoptics in both the musical and security fields there are certain unique advantages obtained not the least of which is cost. In the application of musical instruments the sound detected is more truly representative of the instrument itself due to the flexibility of silicon. If fiber-optics as taught by this invention are applied to the security field they would be virtually undetectable due to their non-metallic nature.

Where fibers are used in the prior art as acoustic transducers they have generally not lent themselves well to either musical or security applications. Such techniques are discussed in U.S. Pat. No. 3,920,982 issued to Harris and in U.S. Pat. No. 4,086,484 issued to Steensma. According to the disclosure a phonon-photon interaction produces a change in the index of refraction of the fiber thus allowing optical energy to escape from the fiber which is modulated by the frequency of the acoustic wave. While the method works well for multi-plexing broad band information onto a continuous optical carrier it does not work well in the low frequency range, typically less than 20 kilocycles such as required by either a security sensor or in the context of a musical instrument string. The photon-phonon interaction depends upon the ratio of the velocity of sound and light in the medium which are typically in the order of one to one million. Thus a photon which is $10^5$ times more energetic than a phonon can be controlled by a phonon, requring for modulation an acoustic wave in the ultrasonic region far beyond the sound of a footstep or musical note.

Other acousto-optic transducers such as described in U.S. Pat. No. 4,071,753 require that the fiber be broken along its length and that the optical coupling coefficient (a measure of the alignment of two fibers) be modulated by the vibration of the joint. In an effective musical instrument string it is necessary for this fiber to remain taught and vibrate around a resonate frequency determined by the length, density of the material and tension in the fiber. Clearly any break in the fiber would effect the harmonic qualities that are desired. Likewise in an effective security line type sensor it is desirable for the transducer to be active throughout its entire length. A dead section could represent a weakness and would not be tolerable. A line sensor operating on the principle of a modulated coupling coefficient would require far too many breaks over the desired 100 meter range and therefore severely limit the total amount of light received by the detector.

The present invention contemplates the use of a laser and an optical fiber but does not rely on a photon-phonon interaction nor on a modulated coupling coefficient to produce a modulation in the output power. Instead, the disclosed invention requires a mechanical disturbance of the fiber such as that caused by the resonance of the fiber under tension as might be found on a musical instrument or as caused by its vibration in sympathy with the surrounding ground as might be found in response to an intruder's footstep. The coherent optical signal when transmitted along the fiber breaks up into a large number of individual rays. Each ray seeks its own path along the fiber. For example, out of a bundle of rays there might be two, A and B respectively. The relative path length between ray A and ray B produces an interference pattern in the output of the fiber. As the fiber is disturbed the interference pattern changes due to the change in the relative path length of the rays as they travel the length of the fiber. A square law power detector is used to detect this change in the interference pattern. This change is detected as a modulation of the output power due to the wave nature of the light as discussed by A. McLean Nicholson in U.S. Pat. No. 1,951,523.

SUMMARY OF THE INVENTION

Briefly described the invention includes a solid state laser or other suitable source of coherent light, a length of fiberoptical material, a square law detector for measuring the light transmitted through the fiber and an amplifier and speaker. The mounting of the strings in the context of a musical instrument depends of course upon the nature of the instrument (guitar, violin, piano, etc.). The device used to apply tension to the strings should not be such as to require that the fiber be sharply bent or crimped in any way. A novel way to accomplish this end is to employ a rack and pinion type tuning mechanism as described later on. This novel configuration does not require the fiber to be bent around a peg in the conventional fashion which normally would impede the transmission of optical radiation. Preferably the connecting joints should be strong enough to withstand the normal forces experienced by the strings of a musical instrument. The male end is affixed to the instrument. Since the fiberoptic material transmits energy in both directions it may be reversed. Strong fibers are preferably in use in order to withstand the abuse of constant play. For various different other frequency requirements it may be necessary to alter other physical characteristics of the strings. For example a change in the density of the string material or a jacketing of the string with another material could have desirable affects. The amplifier circuit should naturally be made to provide the desired output power required and should also include tone control to affect the desired mood as presently provided by most conventional electronic guitar amplifiers. The output of the detector can be made to match existing equipment in that regard.

For the security sensor it may be desirable to provide heavy clading comensurate with various environmental conditions so as to protect the life of the transducer. However, the clading should not detrimentally effect the response of the fiber to a disturbance. A Teflon ® jacket could be sufficient. Typically line sensors are buried between 18 and 36 inches beneath the soil to be optimally responsive to disturbances up to ten feet on either side and to protect the transducer from the effects of frost. The output signal from the line sensor can be made compatible with existing processing hardware. Such processing hardware is responsible for discriminating between a valid intruder and various nuisances. This is necessary so that an alarm is sounded only when justification exsists and much work has been performed in this field and it is not within the scope of this invention to improve upon those processing techniques. Rather the apparatus of this invention is adapted to provide existing equipment with improved information regarding the response of the surrounding soil to an intruder by producing a modulated signal which closely follows in amplitude and frequency the disturbance itself.

DETAILED DESCRIPTION OF THE INVENTION

During the course of this description like numbers will be used to indicate like elements in the different figures which illustrate the invention.

Figure 1:
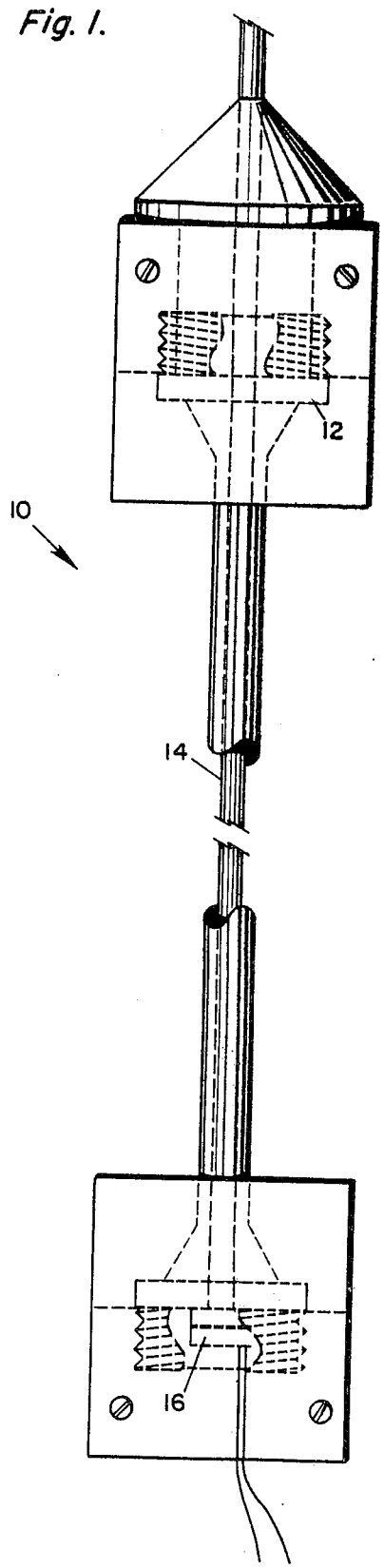
FIG. 1 is a schematic representation of the invention as found in the context of a guitar string showing one laser diode and one detector per fiberoptic string.

A specific preferred embodiment of this invention is shown in FIGS. 1-5C. The system 10 is illustrated in the context of a guitar and includes the following active elements: a single solid state laser 12, an elongated optical fiber string 14, a detector element 16 and an operational amplifier 18 (shown in FIG.3). In FIG. 1 each string 14 has an individual laser 12 and detector 16. The strings 14 are played by a musician 20 in the conventional manner. That provides the modulating input to the strings 14. The transmitting 28 and receiving 26 ends of the strings 14 are firmly fastened to the body of the guitar 22. The guitar body 22 is illustrated generally in FIGS. 4A and 4B and more specifically in the details of FIGS. 5A and 5B. While a guitar 22 (as shown in FIGS. 4A and 4B) is the preferred embodiment of the invention it will be appreciated that the same effects may be obtained on other instruments such as violins, pianos and that no special instruction is necessary for the musician 20 in order to apply applicant's invention.

Figure 2A:
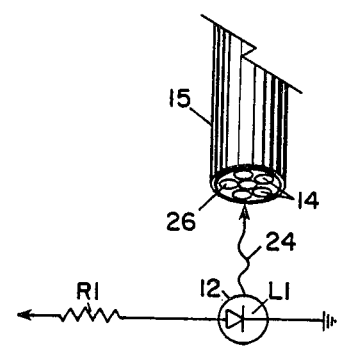
FIG. 2A is an electrical schematic illustrating the transmitting end of the apparatus showing six fibers being fed by a single coherent light source.

The solid state transmitting laser 12 of FIG. 2A provides the coherent optical radiation that forms the input to bundle 15 of optical fibers 14. The fiber bundle 15 transmits the light energy 24 to the individual strings 14. The musician 20 provides the mechanical modulation according to the music that he is required to play. The musicians actions result in a modulation of the multipath interference pattern at the output 28 of the strings 14. The output pattern is the natural result of propagating coherent optical radiation 24 along the fibers 14. A mechanical disturbance, such as created by musician 20, causes the pattern to change. The change which produces the modulation in the output of the detector diode D1 is A.C. coupled via a capacitor C1 to an operational amplifier T1. The ratio of resistors R4 to R5 provides the necessary gain to the signal which is again A.C. coupled via capacitor C2 to the output of the instrument.

Resistor R1 of FIG. 2A is necessary to provide a 2 volt drop across the laser diode L1 (12). The resistor R2 of FIG. 2B is necessary in order to place photodiode D1 in the proper operating range for the desired audio frequency response, thus maximizing the power output from the diode D1 for a given optical power input from the laser L1.

Figure 2B:
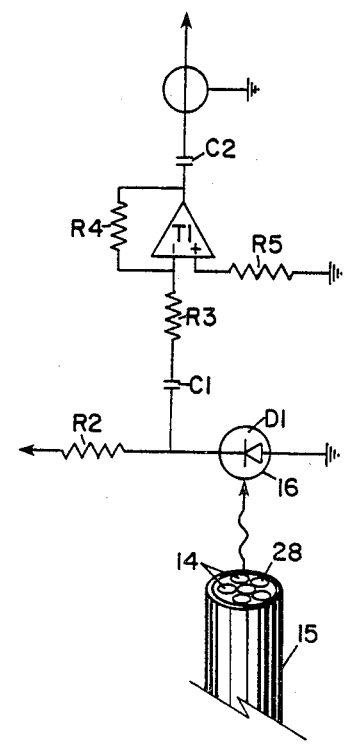
FIG. 2B is an electrical schematic of the receiving end of the invention showing six fibers feeding one detector diode.
Figure 3:
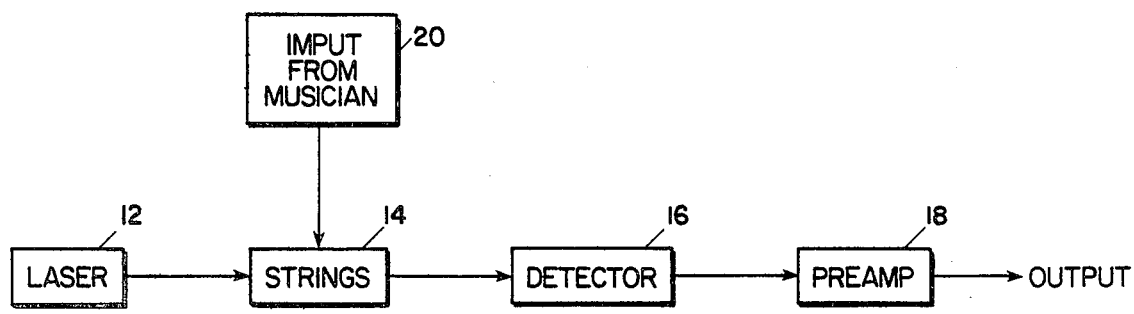
FIG. 3 is a block diagram illustrating the invention in the context of a musical instrument.

The elements illustrated in FIGS. 2A and 2B have the following values:

| Element | Value |
| --- | --- |
| R1 | 60 ohms |
| R2 | 100 K ohms |
| R3 | 10 K ohms |
| R4 | 100 K ohms |
| R5 | 10 K ohms |
| C1 | .5 microfarads |
| C2 | 1 microfarad |
| T1 | Model 741 operational amplifier |
| L1 | Model C30130 |
| D1 | Model SGD100A detector |

The devices illustrated in FIGS. 2A and 2B are not intended to limit the invention to any particular circuitry. The purpose of these figures is to demonstrate to those skilled in the art how the basic teaching of the invention can be reduced to practice in a variety of useful embodiments.

Figure 4A:
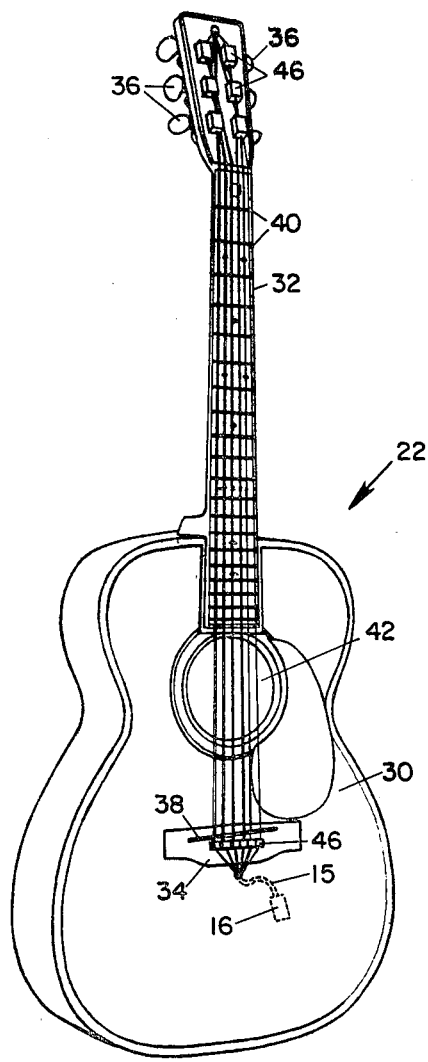
FIG. 4A illustrates a guitar which employs the teaching of this invention.
Figure 4B:
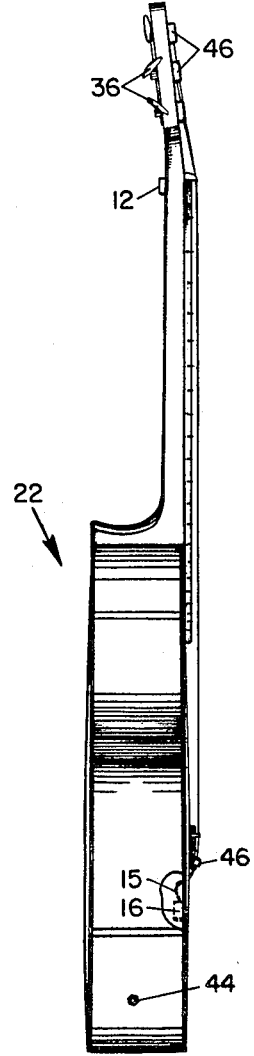
FIG. 4B is a partial cross-section of the guitar illustrated in FIG. 4A.

Galium Arsenide laser L1 directs its light 24 into fiber bundle 13 which is just one of six optical strings 14 in the guitar 22 illustrated in FIGS. 4A and 4B. Each string 14 is mechanically modulated by musician 20 to a desired frequency which results in modulation in the detectable output power received by detector diode D1 due to the multi-path interference phenomenon. The optical modulation imposed on the light 24 is converted into electrical modulation due to the presence of photodiode D1. The now modulated electrical signal is pre-amplified by amplifier 18 and is then suitable for output interfacing with a conventional guitar amplifier. The output is connected to an ordinary guitar amplifier and speaker system or to a recording system or other similar device.

The acoustic energy generated by the haromonic coupling of musician and instrument is converted first to an optical modulation via the laser and multi-mode or single index fiber-string, then to an electrical signal via photodiode detector D1 and subsequently preamplified by preamplifier 18. The output signal from preamplifier 18 is such that further manipulating can be accomplished, if desired, to modify the tonal and vibrato characteristics of the instrument.

The invention is not limited to the specific single laser/detector system shown in the drawings, but would also comprehend an embodiment in which each fiber string had its own laser and detector and tone control as in FIG. 1. This alternative embodiment may be desirable because of the flexibility given to the musician and would be practical if production techniques allow the price of solid state continuous power lasers to decline. The invention also, though not specifically detailed, comprehends pulse laser systems provided, of course, that the pulse repetition rate is high enough to allow proper filtering from the audio range. Such an approach may result in a lower cost system.

The present invention is further not limited to the use of lasers in general but is understood to include virtually all sources of optical radiation which have a coherence length sufficient to allow the multi-path interference phenomenon to occur at the output 28 of the fiber 14. For example, an LED (Light Emitting Diode) with a coherent length of a few centimeters could be substituted for a laser in either the continous power or pulse modes of operation.

The invention can also comprehend the use of high temperature coherent light sources if means, such as cooling devices, can be used to stabilize the output. Moreover, there may be feedback techniques which can be used to provide stability for high temperature coherent light generators and those too may be acceptable substitutions under certain circumstances.

Physical details of the guitar are shown in FIGS. 4A–5C. A typical guitar 22 includes a body or box 30 and a neck 32 attached to the body 30. The strings 14 are anchored to the body by an anchoring device 34. The other end of the string is attached to tension knobs 36 at the top of the neck 32. A bridge 38 sets the height of the strings 14 above the neck 32. Fingering fret 40 allows the musician 20 to finger the strings in the conventional manner. The guitar body 30 usually includes at least one sound hole 42 which allow the sound on the interior of the guitar to escape. The optical detectors 16 are located near anchoring device 34.

FIG. 4B is a partial cross-sectional diagram of the guitar illustrated in FIG. 4A. The preamplifier 18 is preferably housed within the body 30 so that it doesn't interfere with the musician 20. Its output is connected to a jack 44 which is electrically and mechanically compatible with conventional prior art guitar amplifying systems. According to the preferred embodiment of the invention releasable connectors 46 may be used to attach new strings 14 to the existing transmitter and detector mechanisms. The light emitting laser 12 is preferably located on the back side of the neck 30 in order to keep it out of the way of the musician.

Figure 5A:
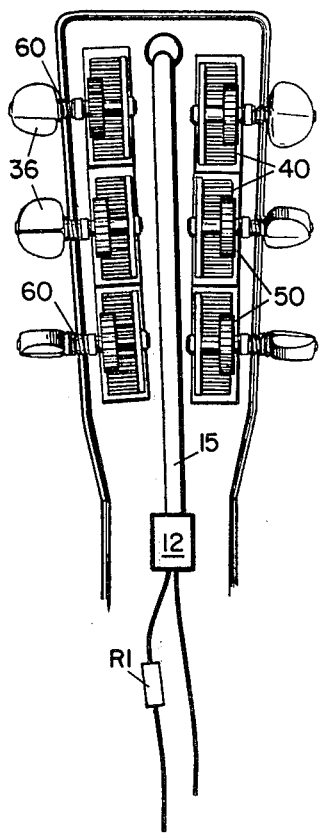
FIG. 5A is a detail of the back of the top of the guitar illustrating the manner in which coherent light is fed into the guitar strings.
Figure 5B:
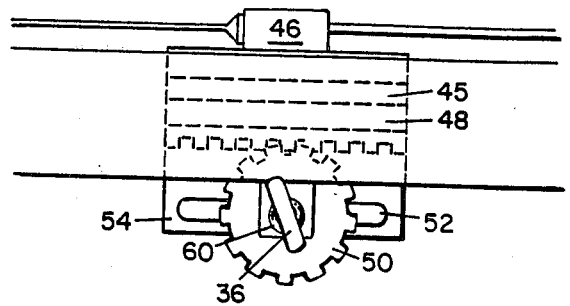
FIG. 5B is a cross-sectional diagram of a detail of FIG. 5A showing the mechanism by which the strings may be tuned on a rack and pinion device.
Figure 5C:
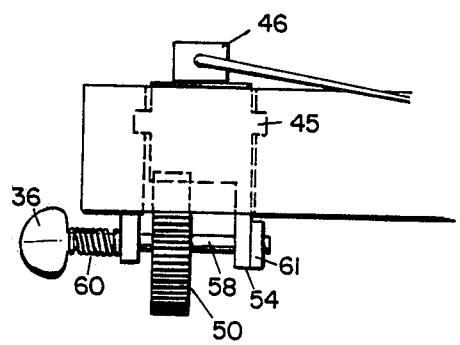
FIG. 5C is a profile of the mechanism illustrated in FIG. 5B.

Details of the upper neck of the guitar are shown in FIGS. 5A, 5B, and 5C. The connectors 46, fiber strings 14 are connected to and carried by rack 48. The strings, of course, have a fiber core which allow transmittal of the optical signal 24 from the laser 12. Rack 48 is fitted into a groove 45 in the guitar in such a manner as to allow backward and forward motion. A pinion gear 50 includes a shaft 58 which is anchored to the neck 32 of the guitar by bracket 54 and the pinion gear 50 only provides rotary motion to drive the rack 48 backward and forward. Shaft 58 is received in a slot 52 which is set in mounting bracket 54. A spring-loaded drag shoe 61 is adapted to engage bracket 54 and hold pinion gear 50 and rack 48 in position during play of the instrument. Thumb pressure applied to knob 36 is sufficient to release the brake mechanism if returning is required. FIG. 5C illustrates in cross-sectional profile how the knob 36 is connected to pinion gear 50 via a shaft 58 and loading spring 60.

The fiber 14 leading from laser 12 is mechanically and an integral part of rack 48. String 14 is mounted to the rack via connector 46 thereby retaining optical continuity from laser 12 to detector 16. Connectors such as those illustrated as elements 46 are known to those of ordinary skill in the art.

The rack and pinion tuner shown in detail in FIGS. 5A–5C is included for the purpose of describing a preferred means for tuning an instrument without distorting the fiber unnecessarily and is included by way of example only. It is possible that there are other means that may be used to achieve the same purpose.

Power to the system can be supplied through the use of batteries, solar cells, or a regulated D.C. supply or similar sources known to those of ordinary skill in the art. It is also possible that other devices may be employed to substitute for the detector circuit illustrated in FIG. 2B. Other such methods and apparatus would possibly include employing individual instrumentation amplifiers, individual input lasers of different frequencies and matching detectors.

The mechanical properties of the fiber 14 are important in determining the frequency of vibration of the fiber itself which in turns produces the multi-path interference pattern and the associated modulation of the output power. Hence it is necessary to employ strings 14 which have a fundamental mode of vibration at different desired frequencies. To accomplish this end each string has a cross-sectional area, density, and length sufficient to achieve the desired frequency under a given tension provided by the rack and pinion tuner mechanism. For example, up to 88 different strings would be required if the teaching of the invention were applied to an optical piano. Six strings would, of course, be required for a conventional guitar. According to the preferred embodiment each string could be made with a uniform fiber and jacketed with different amounts and types of clading in order to provide the desired mass/density, length and tension. Uniformity in fiber would provide uniformity in power modulation whereas differences in clading would provide for differences in tonal frequency generated by the musician (i.e. thick strings would be provided for low notes, thin strings for high notes).

Several fibers have been commercially developed for many different applications. These include fibers with a single index of refraction, step index of refraction and the so-called graded index of refraction fiber. The purpose of varying the index of refraction along the radius of the fiber is to prevent light from escaping from the fiber walls, thus decreasing the amount of attenuation per meter. For the purpose of this invention and to maximize the effect of the multipath interference phenomena the single index fiber is preferred followed by the step index of refraction fiber and last but still effective is the multimode graded index of refraction fiber. SDF Corguide ® fiber as manufactured by Corning Glass Works, Corning, N.Y. 14830 is a strong multimode graded index of refraction fiber which is currently available and relatively inexpensive fiber. This fiber although not optimal will produce the desired effect. Since the majority of fibers currently available are designed primarily for the communications field a fiber designed to maximize the multipath interference phenomena could be produced as a speciality item.

The fundamental frequency of a typical string 14 is given by the formula:

$$F = \frac{1}{2L} \sqrt{\frac{T}{P}}$$

where
F = Fundamental frequency of the string 14
L = Length of the string 14
T = Tension provided by the rack and pinion tuner
P = Mass per unit length of the string under tension.

Figure 6:
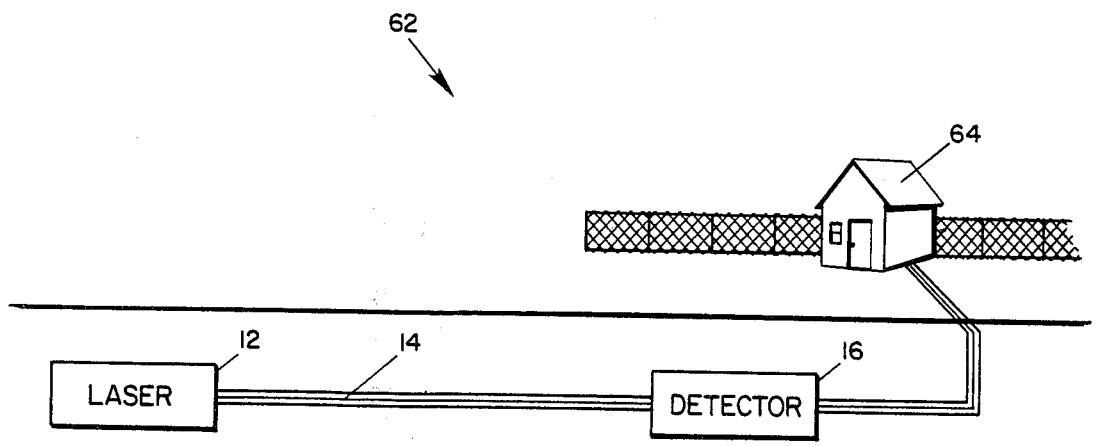
FIG. 6 illustrates the basic teaching of the invention in the embodiment of an intrusion detection system.

FIG. 6 illustrates how the teaching of the present invention can be employed in an intrusion detection system 62. The system 62 in its simplest embodiment includes a solid state laser source 12, a fiberoptic cable 14 and a solid state optical detector 16. The cable 14 is preferably buried 18 to 36 inches under ground and might have a typical length of about 100 meters. The range of sensitivity on both sides of the cable 14 would be approximately 10 feet in a direction perpendicular to the length of the cable 14. The output of the solid state detector 16 would preferably be connected to a guardhouse 64 or similar alarm command post. Thus far the embodiment of the invention in an intrusion detection system is essentially similar to the same apparatus as described in the context of a guitar string as shown in FIG. 1.

Figure 7:
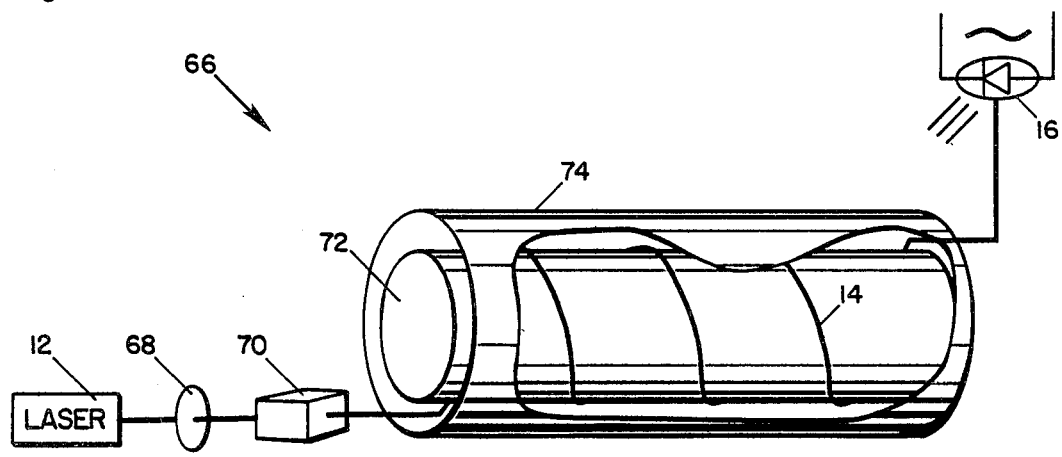
FIG. 7 is a schematic representation of a modulated bending loss intrusion detection system.

It is also possible to take advantage of other features of optical fibers in order to detect an intruder. FIG. 7 illustrates how the modulated bending loss of a fiber may be used for that purpose. When a fiber undergoes bending and an optical signal is transmitted along the fiber, losses will occur as the radius of curvature approaches 3 centimeters. If the radius of curvature is then modulated due to a disturbance, the detectable output power will reproduce this modulation in the form of a modulated electrical signal. This effect is enhanced through the use of coherent optical radiation because the higher modes of propagation are more susceptible to escaping from the fiber wall. Accordingly, the technique of loss modulation can be used to detect the presence of an intruder without the necessity of cutting the fiber as described in U.S. Pat. No. 4,071,753.

FIG. 7 illustrates how this technique is employed in the context of ground sensor technology. The system 66 includes a laser light source 12, a focusing lens 68 and an index matching reservoir 70 which includes fluid to match the output of laser 12 with the index of refraction of the fiber 14. The reservoir 70 preferably includes nine (9) parts glycerin to one (1) part water or suitable substitute. The optical fiber 14 is wrapped around a flexible cylindrical core 72. The output of the buried portion is fed into a detector 16 which may be similar to that illustrated in the schematic of FIG. 2B. The core and fiber combination may be claded with a jacket 74 to protect the buried portion from the environment. The radius r of the flexible cylindrical core 72 can be varied to maximize the output signal. The output signal is also dependent upon the fiber length, the material of the fiber and other parameters. The maximum acceptable bending radius of a fiber 14 when used in the modulated bending loss mode is in the neighborhood of 3 centimeters. The modulated bending loss mode of operation may also be applied as a technique to detect the vibration of a main structural component in an aircraft, thereby warning the pilot in advance before safe metal fatique limits are exceeded.

It is also possible to employ a basic teaching of the invention in an embodiment which takes advantage of the photoelastic effect on optical fiber 14. This technique is illustrated in the system 76 of FIG. 8. The photo-elastic effect produces a modulation in the detectable output power of a fiber 14 which is disturbed in a manner similar to that described throughout this disclosure. When coherent radiation is propagated along a stretchable portion of a fiber and is allowed to interfere with the coherent output of an undisturbed fiber, then an interference pattern is produced which may be detected by a suitable detector 16. As the load or amount of stretching varies with time, the interference pattern also varies, thus producing a time amplitude histogram in the output of detector 16.

Figure 8:
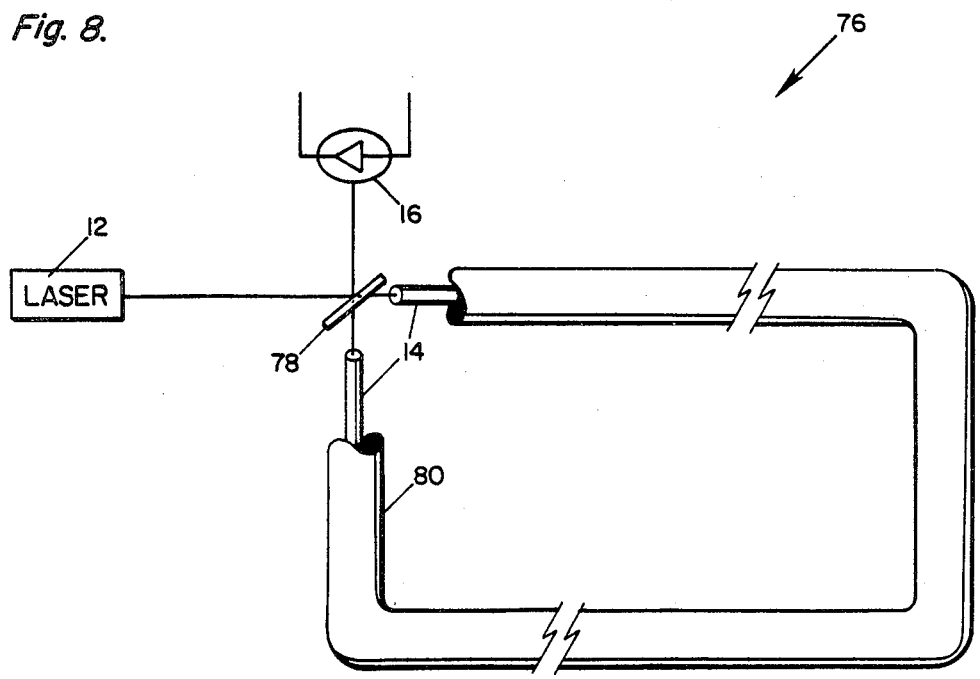
FIG. 8 is an alternative embodiment of the invention in which an intrusion detection system or guitar may be operated based upon the photoelastic effect of the optical fiber.

FIG. 8 shows in detail the application of the photoelastic effect concept to a security sensor system where the active length of the fiber 14 is buried and allowed to be stretched by the deformation of the ground above it as might be caused by the footstep of an intruder. The system 76 includes a laser light source 12 and a beam splitting mirror 78. Part of the beam is therefore reflected directly into the face of photo detector 16. Another portion of the beam passes though splitter 78. The light passing through the fiber 14 is returned back to the beam splitter 78 where it is also detected by photo detector 16. A suitable jacket 80 would preferably cover the portion of the fiber 14 that is buried underground. Single mode fibers are preferably employed in order to limit the multi-path interference effect and enhance the photoelastic effect. Generally, the photoelastic effect does not contribute to the modulation produced by the multi-path interference effect, since in the application of the latter concept no reference signal is requied. Beam splitter 78 acts as a michaelson type interferometer which decodes the phase modulation induced by stresses on the fiber 14. While the photoelastic embodiment is preferably employed as an intrusion detection sensor, it will be appreciated by those of ordinary skill in the art that it might also find applicability for use in a musical instrument.

While the invention has been described with reference to a preferred embodiment thereof it will be understood by those of ordinary skill in the art that various changes can be made to the elements of the embodiments that comprise the invention without departing from the spirit and scope thereof.

I claim:

1. A musical instrument including a low frequency laser fiberoptic detector apparatus comprising:
    a plurality of elongated optical fiber means each having a light receiving end and a light transmitting end;
    a plurality of tension means associated respectively with each of said elongated optical fiber means for putting at least a portion of each of said elongated optical fiber means into tension;
    a musical instrument body means for carrying said plurality of optical fiber means and said plurality of tension means;
    coherent light source means for introducing coherent light into said plurality of elongated optical fiber means; and,
    optical detector means for detecting the multi-path interference pattern of said light as received by said detector means at the transmitting end of said plurality of elongated optical fiber means and converting said pattern into an electrical signal,
    wherein low frequency vibrations in the musical frequency range imparted to said elongated optical fiber means are detected by said detector means and converted into electrical signals having a frequency directly proportional to the frequency of vibration of said elongated optical fiber means.

2. The apparatus of claim 1 wherein said body means comprises a guitar body.

3. The apparatus of claim 2 wherein said coherent light source means comprises a solid state laser device.

4. The apparatus of claim 3 wherein said detector means comprises a square law detector.

5. The apparatus of claim 4 further including:
    amplifier means connected to said detector means for amplifying the output thereof.

6. The apparatus of claim 5 wherein said tension means comprises:
    a gear rack having teeth thereon and slidably received in a groove in said guitar body;
    a pinion gear having teeth which engage said teeth of said gear rack;
    a shaft passing through said gear;
    means for rotatably attaching said shaft to said guitar body;
    means on said rack for carrying and supporting at least one of said elongated optical fiber means;
    bracket means attached to said rack and having a slot therein adapted to receive said shaft; and,
    a manipulatable knob means attached to said shaft for driving said pinion gear means back and forth along said gear rack.

7. The apparatus of claim 6 further including a spring means surrounding said shaft for selectively locking said tension means in a fixed location.

8. A low frequency intrusion detection apparatus comprising:
    at least one elongated optical fiber means having a light receiving end and a light transmitting end;
    tension means for stretching said optical fiber means so that it has a fundamental frequency below 20,000 cycles per second;
    protection means for protecting said elongated optical fiber means from the environment;
    coherent light source means for introducing coherent light into said light receiving end; and,
    optical detector means for detecting the multi-path interference pattern of said light as received by said detector means at the transmitting end of said elongated optical fiber means and converting said pattern into an electrical signal,
    wherein said elongated optical fiber means is buried underground and said apparatus is responsive to the ground disturbance of an intruder thereabove.

9. The apparatus of claim 8 wherein said elongated optical fiber means is buried between 18" and 36" in depth underground and has a length of approximately 100 meters.

* * * * *